Nov. 28, 1939.  T. DOMOTO  2,181,511
CAN FOR RICE AND SIMILAR EDIBLE SUBSTANCES
Filed Aug. 24, 1937
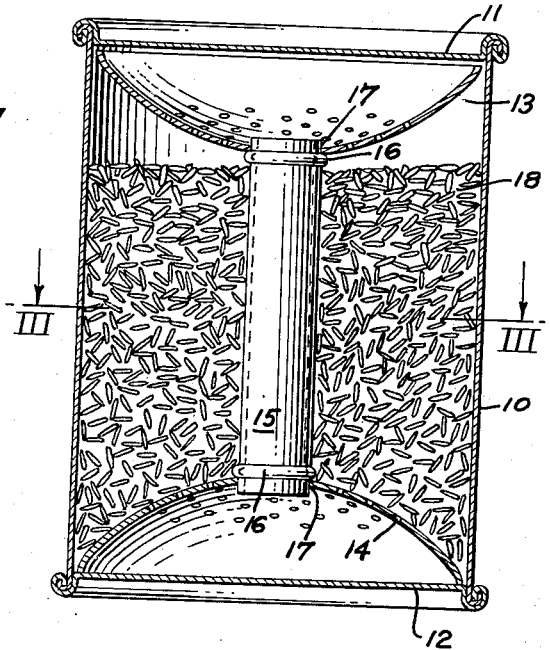
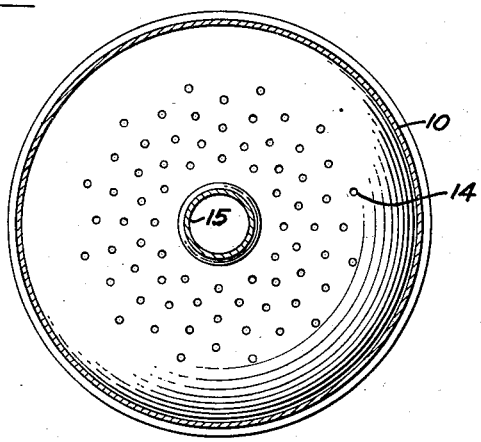
INVENTOR.
TAKANOSHIN DOMOTO
BY
Jas. M. Naylor
ATTORNEY.

Patented Nov. 28, 1939

2,181,511

UNITED STATES PATENT OFFICE 2,181,511

CAN FOR RICE AND SIMILAR EDIBLE SUBSTANCES

Takanoshin Domoto, Oakland, Calif.

Application August 24, 1937, Serial No. 160,597

2 Claims. (Cl. 220—1)

The present invention relates to improvements in cans for rice and similar edible substances.

It is an object of this invention to provide a receptacle for the material named which will present advantages over the prior art structures in so far as the retention of the material packed in desirable condition is concerned, and also to provide a receptacle which will effect certain desirable economies in the cooking of the food contained thereby.

In brief these and other objects, which will become more apparent as this specification proceeds, are accomplished by the provision of a can structure in which a pair of bowl-shaped perforate members are fitted at the top and bottom of the can and held in spaced relation by an open tubular member, the material contained thereby being packed between the perforate members and around the tubular member. The bowl-shaped perforate members provide a drainage area into which free liquids may be drained regardless of whether the can is stood upon its top or bottom. The tubular member which, as indicated, serves to hold the bowl-shaped members in spaced relation, also serves to more evenly distribute the heat throughout the container during the cooking process and thus to materially improve the quality of the pack as well as shorten the time required for this purpose.

Further objects of the invention will become apparent as the specification proceeds and the novelty of the invention will be particularly pointed out in the appended claims.

In the drawing forming a part hereof:

Figure 1 is a vertical section through a can embodying the novel features of this invention, with certain of the parts and the material contained thereby being shown in elevation, and Figure 2 is a section taken along the line III—III of Figure 1.

The novel principles of this invention are adapted for use in conjunction with a can 10 of conventional construction, such as an open ended cylinder of tin or like material closed at its two ends by a top 11 and a bottom 12 crimped thereto to provide a hermetically sealed receptacle.

A pair of perforate bowl-shaped members 13 and 14 are held in spaced relation by a tubular member 15, the member 13, in the present instance, being arranged so that its concaved surface is disposed toward the top 11, and the bowl member 14 being likewise disposed toward the bottom 12.

The ends of the tubular member 15 project through the apertures 17 in the perforate bowl-shaped members 13 and 14 and the three elements are maintained in the position illustrated in Figure 1 by the provision of the annular rings or shoulders 16 on the tubular member 15 which bear against the members 13 and 14.

In the preferred form of the invention illustrated in the accompanying drawing the product shown as being packed is rice, designated by the numeral 18. It will be noted that the rice is shown as packed between the perforate bowl-shaped members 13 and 14 and around the tubular member 15. In canning rice it is highly desirable to keep the bulk thereof relatively free of all moisture and particularly free of liquids which have a tendency to break down the composition of the individual rice kernels when the pack is allowed to stand any appreciable length of time. When the individual kernels of rice are thus broken down the product attains a "mushy" like appearance or characteristic and this has been found highly undesirable from a standpoint of purchaser appeal.

Thus it is an object of the present invention, through the means illustrated and heretofore described to provide a container adapted to drain the material packed of all free liquids and retain the same in this separated condition as long as the package shall be allowed to stand. Hence, assuming that the can 10, in storage, is stood upon the bottom 12, the free liquids accompanying the rice 18 would be drained into the area defined by the perforate bowl-shaped member 14 and thus kept separate from the rice 18. In the event that the package is inverted, that is to say, stood upon its top 11 the said free liquids would drain, either through the bulk of rice 18, or the tubular member 15 or both, into the area defined by the bowl-shaped perforate member 13.

In addition to thus serving as a drainage conduit the tubular member 15 also serves to more evenly distribute the heat throughout the interior of the container 10 during the cooking process. It is a well known fact that in ordinary canning practices, the food nearest the walls of the tin is frequently subjected to overcooking when the temperature is gauged so as to effectively and thoroughly process the material at the middle of the container. Conversely, when a lower temperature or a shorter cooking period is employed there are instances of undercooking of the material at the center of the container. These conditions are particularly noticeable in the case of the dense packs, of which rice is an example.

I am aware of the fact that various means have been devised in an effort to overcome these evils but I am not aware that as yet any practical devices have been developed. It is apparent that the tubular member 15 when used in conjunction with the other elements of my invention will adequately accomplish the desired objective. Heat will freely pass through the tubular member 15 and desirably affect the material in the center area of the tin.

Having thus described my invention, what I claim and desire to secure by Letters Patent is:

1. A hermetically sealed container of the class described comprising a cylinder, top and bottom closures therefor, a pair of bowl-shaped perforate members having their concavities disposed toward and bearing against said top and bottom, respectively, each of said perforate members having an axial aperture, a tubular member between said perforate members with its ends projecting through said axial apertures, and a pair of annular rings on said tubular member bearing against the convex sides of said perforate members.

2. In a hermetically sealed container for rice and like edible substances the combination of a cylinder, top and bottom closures therefor, a pair of bowl-shaped perforate members of substantially the diameter of the cylinder having their concavities disposed toward and bearing against said top and bottom, respectively, each of said perforate members having an axial aperture, and a tubular spacing member with its ends projecting through said axial apertures, said perforate members and said spacing member defining a medial area within the container for the product to be contained thereby and drainage areas at opposite ends of the container.

TAKANOSHIN DOMOTO.